US010131788B2

(12) United States Patent
Basset et al.

(10) Patent No.: US 10,131,788 B2
(45) Date of Patent: Nov. 20, 2018

(54) BITUMINOUS COMPOSITIONS COMPRISING ADDITIVES HAVING IMPROVED THERMOREVERSIBLE PROPERTIES

(71) Applicant: TOTAL MARKETING SERVICES, Puteaux (FR)

(72) Inventors: Dominique Basset, Saint Clair du Rhône (FR); Régis Vincent, Grigny (FR)

(73) Assignee: Total Marketing Services, Puteaux (FR)

( * ) Notice: Subject to any disclaimer, the term of this patent is extended or adjusted under 35 U.S.C. 154(b) by 810 days.

(21) Appl. No.: 14/411,711

(22) PCT Filed: Jun. 28, 2013

(86) PCT No.: PCT/EP2013/063596
§ 371 (c)(1),
(2) Date: Dec. 29, 2014

(87) PCT Pub. No.: WO2014/005935
PCT Pub. Date: Jan. 9, 2014

(65) Prior Publication Data
US 2015/0183994 A1 Jul. 2, 2015

(30) Foreign Application Priority Data

Jul. 2, 2012 (FR) ...................................... 12 56315

(51) Int. Cl.
C08L 95/00 (2006.01)
C09D 195/00 (2006.01)
C08K 5/092 (2006.01)
C08K 5/20 (2006.01)
C08K 5/21 (2006.01)
C08K 5/25 (2006.01)
C08K 5/10 (2006.01)

(52) U.S. Cl.
CPC ............ C08L 95/00 (2013.01); C09D 195/00 (2013.01); C08K 5/092 (2013.01); C08K 5/10 (2013.01); C08K 5/20 (2013.01); C08K 5/21 (2013.01); C08K 5/25 (2013.01); C08L 2555/26 (2013.01); C08L 2555/60 (2013.01); C08L 2555/64 (2013.01); C08L 2555/80 (2013.01)

(58) Field of Classification Search
CPC .. C08L 95/00; C08L 2555/26; C08L 2555/60; C08L 2555/64; C08L 2555/80; C09D 195/00; C08K 5/092; C08K 5/10; C08K 5/20; C08K 5/21; C08K 5/25
See application file for complete search history.

(56) References Cited

U.S. PATENT DOCUMENTS

| 3,035,930 | A | * | 5/1962 | Talley | ................... C08L 95/00 106/279 |
| 3,483,153 | A | | 12/1969 | Pitchford | |
| 4,145,322 | A | | 3/1979 | Maldonado et al. | |
| 4,242,246 | A | | 12/1980 | Maldonado et al. | |
| 5,756,565 | A | | 5/1998 | Germanaud et al. | |
| 5,883,162 | A | | 3/1999 | Planche et al. | |
| 6,011,094 | A | * | 1/2000 | Planche | ................... C08L 95/00 524/68 |
| 6,623,554 | B2 | * | 9/2003 | Kinnaird | ............... C09D 195/00 106/246 |
| 8,202,922 | B2 | | 6/2012 | Botel et al. | |
| 8,273,809 | B2 | | 9/2012 | Chaverot et al. | |
| 8,273,819 | B2 | | 9/2012 | Gauthier et al. | |
| 8,506,699 | B2 | | 8/2013 | Chaverot et al. | |
| 8,722,776 | B2 | | 5/2014 | Chaverot et al. | |
| 8,748,517 | B2 | | 6/2014 | Harders et al. | |
| 8,772,381 | B2 | | 7/2014 | Harders et al. | |
| 8,883,930 | B2 | | 11/2014 | Harders et al. | |
| 2009/0137705 | A1 | * | 5/2009 | Faucon Dumont | ..... C04B 26/26 524/71 |
| 2009/0318602 | A1 | * | 12/2009 | Deneuvillers | ........... C04B 28/02 524/425 |
| 2010/0192804 | A1 | * | 8/2010 | Lapalu | ................. C08K 5/0008 106/277 |
| 2012/0060722 | A1 | | 3/2012 | Montpeyroux et al. | |

(Continued)

FOREIGN PATENT DOCUMENTS

WO WO-2008/107551 A2 9/2008
WO WO-2009/101275 A1 8/2009

OTHER PUBLICATIONS

Terech, Pierre, et al.; "Low Molecular Mass Gelators of Organic Liquids and the Properties of Their Gels;" Chemical Reviews, American Chemical Society, vol. 97, No. 8, Jan. 1, 1997; pp. 3133-3159.

Primary Examiner — Jennifer A Smith
Assistant Examiner — Alexandra M Moore
(74) Attorney, Agent, or Firm — Harness, Dickey & Pierce, PLC

(57) ABSTRACT

The disclosure relates to a bituminous composition and to the method of preparation thereof. The bituminous composition includes a bitumen, a first additive including at least one fatty acid ester function, saturated or unsaturated, linear or branched, having a hydrocarbon chain with 4 to 36 carbon atoms, optionally substituted by at least one hydroxyl group and a second additive comprising at least one organogelator. The disclosure also relates to the use of a combination of the first and second additives in a bituminous composition, for lowering the dynamic viscosity of a bituminous composition or of a bitumen base at a temperature above or equal to 80° C., preferably above 80° C., without impairing the consistence of the composition at the temperatures of use. Finally, the disclosure relates to the use of these bituminous compositions in the fields of highway applications, in particular in the manufacture of highway binders, and in the fields of industrial applications.

17 Claims, No Drawings

(56) References Cited

U.S. PATENT DOCUMENTS

| | | |
|---|---|---|
| 2012/0123028 A1 | 5/2012 | Dreesen et al. |
| 2012/0315088 A1* | 12/2012 | Deneuvillers ........ C09D 195/00 404/75 |
| 2013/0036941 A1 | 2/2013 | Harders et al. |
| 2013/0041075 A1 | 2/2013 | Harders et al. |
| 2014/0024735 A1 | 1/2014 | Harders et al. |
| 2014/0357774 A1 | 12/2014 | Schroeder |

* cited by examiner

BITUMINOUS COMPOSITIONS COMPRISING ADDITIVES HAVING IMPROVED THERMOREVERSIBLE PROPERTIES

CROSS-REFERENCE TO RELATED APPLICATIONS

This application is a National Phase Entry of International Application No. PCT/EP2013/063596, filed on Jun. 28, 2013, which claims priority to French Patent Application Serial No. 1256315, filed on Jul. 2, 2012, both of which are incorporated by reference herein.

TECHNICAL FIELD

The present invention relates to the field of bitumens, in particular bituminous compositions. The invention relates to bituminous compositions and the method of preparation thereof. Moreover, the subject of the present invention relates to the use of additives for improving the thermoreversible and rheological properties of bituminous compositions or bitumen bases, in particular for cross-linking them thermoreversibly, for lowering the dynamic viscosity at a temperature above or equal to 80° C., preferably above 80° C., more preferably above or equal to 120° C. The invention aims in particular to bituminous compositions having improved thermoreversible properties. The invention also relates to the use of these bituminous compositions in the fields of highway applications, in particular in the manufacture of highway binders, and in the fields of industrial applications.

BACKGROUND AND SUMMARY

The use of bitumen in the manufacture of materials for highway and industrial applications has long been known: bitumen is the main hydrocarbon binder used in the field of highway construction or civil engineering. For use as a binder in these various applications, bitumen must have some particular physicochemical properties. One of the most important properties is the consistency of the bitumen; this must be high enough at the temperatures of use to avoid the formation of ruts caused by traffic.

The bitumen must also be elastic to resist the deformations imposed by traffic and/or changes in temperature, phenomena which lead to cracking of the bituminous mixes or to stripping of the surface aggregates. Finally, the bitumen must be sufficiently fluid at the lowest possible temperatures of application to allow good coating of the aggregates and the placement of the bituminous mix on the road as well as compacting thereof with the current technical means of the highway profession. The implementation of a bituminous binder therefore requires combining both the hardness and the elasticity of bitumen at the temperatures of use and low viscosity at the temperatures of application. As bitumen on its own is not generally sufficiently elastic, polymers, which may optionally be cross-linked, are added to the bitumen. These cross-linked polymers give the bituminous compositions greatly improved elastic properties and stability in storage.

However, when hot, addition of polymers to the bituminous composition leads as a general rule to an increase in viscosity of the bituminous composition. To be suitable for application on the carriageway, the bituminous binder with added polymers will therefore have to be heated to an application temperature higher than that of a bituminous binder without polymers. This runs counter to the objectives of saving energy, lowering the temperatures of use, reducing emissions of fumes on the construction site and worker protection.

Cross-linking according to the prior art is in most cases irreversible cross-linking based on the formation of covalent bonds between the polymers. Thus, one of the forms of cross-linking most used in the field of bitumens is cross-linking with sulphur or vulcanization. The applicant has developed and patented a certain number of cross-linked bituminous compositions having properties that are greatly improved relative to bitumen without polymers and relative to the non-cross-linked bitumen/polymer physical mixture. Among the applicant's patents, there may be mentioned in particular the following references: FR2376188, FR2429241, EP0799280, EP0690892.

Recently, in two patent applications WO2008107551 and WO2009101275, the applicant described a new method of reversible cross-linking of bituminous compositions, based on the use of organogelling additives. The applicant in particular showed that the organogelling additive may be assimilated to a "supramolecular" polymer and imparts to bitumen with properties equivalent to those of a conventional bitumen/polymer composition, in particular with respect to hardness, while reducing the high-temperature viscosity. The thermoreversibly cross-linked bituminous compositions thus obtained are hard at the temperatures of use and have reduced viscosity at the application temperatures.

Continuing this work, the applicant looked for other compounds allowing bitumens to be hardened at the temperatures of use without increasing their high-temperature viscosity. A further objective of the applicant is to propose new additives capable of improving the rheological properties of a bituminous composition or of a bitumen base, in particular for adjusting the mechanical characteristics of said composition or bitumen base depending on the applications for which the composition is intended.

The mechanical properties of bituminous compositions are generally assessed by determining a series of mechanical characteristics using standardized tests, those used most widely being the softening point determined by the ring and ball test, also called the ring and ball softening point and denoted by RBT, and needle penetration expressed in $\frac{1}{10}$ of mm. An indication of the susceptibility to temperature of bituminous compositions can also be obtained from a correlation between the needle penetration and the RBT of said compositions, known as the penetration index or Pfeiffer index, denoted by PI. The susceptibility to temperature of the bituminous composition decreases as the PI value increases. Low susceptibility to temperature ensures good mechanical behaviour over the temperature range of use of said composition. The applicant therefore concentrated on the effect of additives on the penetration index (or Pfeiffer index, denoted PI), ring and ball softening point (RBT), needle penetration and/or the dynamic viscosity of the bituminous compositions, at a temperature above or equal to 80° C., preferably above 80° C., more preferably above or equal to 120° C.

The invention aims in particular to thermoreversibly cross-linked bituminous compositions, i.e. having, at the temperatures of use, the properties of conventional bituminous compositions with respect to hardness and having reduced viscosity at the application temperatures. Another object of the invention is to propose a simple method for preparing thermoreversibly cross-linked bituminous compositions. According to the invention, this object is achieved with bituminous compositions having improved thermoreversible and rheological properties, in particular having low dynamic viscosity at a temperature above or equal to 80° C., preferably above 80° C., more preferably above or equal to 120° C., without impairing the consistency of said compositions at the temperatures of use.

In particular, the bituminous composition according to the invention comprises:

a bitumen, a first additive comprising at least one fatty acid ester function, saturated or unsaturated, having a hydrocarbon chain with 4 to 36 carbon atoms, linear or branched, optionally substituted by at least one hydroxyl group, a second additive comprising at least one organogelator of the following general formula (I) or (II):

R₁—CONH—X—NHCO—R₂     (I)

in which the groups $R_1$, $R_2$ and X are identical or different and represent independently a hydrocarbon chain with 4 to 36 carbon atoms, saturated or unsaturated, linear or branched, cyclic or acyclic and comprising, optionally, at least one heteroatom selected from O, N and S, preferably O.

R₃—(COOH)_z     (II)

in which $R_3$ is a linear or branched, saturated or unsaturated hydrocarbon chain with 4 to 68 carbon atoms and z is an integer in the range from 2 to 4. According to a particular development, the bituminous composition is cross-linked thermoreversibly.

According to another particular embodiment, the first additive has a general formula (III) as follows:

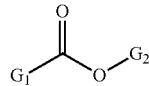
(III)

in which $G_1$ represents a saturated or unsaturated, linear or branched aliphatic hydrocarbon chain with 4 to 36 carbon atoms, optionally substituted by at least one hydroxyl group, $G_2$ represents a saturated or unsaturated, linear or branched aliphatic hydrocarbon chain with 1 to 188 carbon atoms, optionally comprising at least one ester function and/or at least one hydroxyl group.

Preferably, G2 comprises at least one ester function. According to a preferred variant, G2 comprises at least one ester function and at least one hydroxyl group.

According to a preferred variant, the first additive is selected from the group consisting in the saturated or unsaturated mono-, di-, tri-, tetra-, penta- and hexa-esters of fatty acid, comprising at least one linear or branched hydrocarbon chain with 4 to 36 carbon atoms, optionally substituted by at least one hydroxyl group. Preferably, the first additive is selected from the group consisting in the mono-, di- and tri-glycerides of fatty acids, the mono-, di- and tri-glycerides of hydroxy fatty acids, the fatty acid mono-, di-, tri- and tetra-esters of pentaerythritol (PET) and the fatty acid mono-, di-, tri-, tetra-, penta- and hexa-esters of dipentaerythritol (diPET). Advantageously, the first additive is selected from the triglycerides of fatty acids comprising three hydrocarbon chains, identical or different, each independently having from 4 to 36 carbon atoms, saturated or unsaturated, linear or branched, optionally substituted by at least one hydroxyl group. Whatever the type of fatty acid ester of the first additive, saturated fatty acid derivatives will be preferred.

According to another preferred particular embodiment, the organogelator represented by formula (II) is a diacid of general formula HOOC—(CH₂)_w—COOH with w an integer in the range from 4 to 22, preferably from 4 to 18. The organogelator represented by formula (II) is preferably a diacid selected from the group consisting in adipic acid, pimelic acid, suberic acid, azelaic acid, sebacic acid, undecanedioic acid, 1,2-dodecanedioic acid and tetradecanedioic acid.

According to another preferred particular embodiment, the organogelator is represented by formula (I) in which X represents the group —(CH₂)_p— with p being comprised between 1 and 8, preferably between 1 and 4. According to a variant, the organogelator is represented by formula (I) in which $R_1$ and $R_2$ are identical or different and represent, independently, a saturated, acyclic, linear or branched hydrocarbon chain with 4 to 36 carbon atoms, and optionally at least one heteroatom. The organogelator is preferably N,N'-ethylene-bis(stearamide). Preferably, the bituminous composition comprises from 0.1 to 10% by weight of the first and second additives relative to the weight of bitumen.

The combined presence of the first and second additives surprisingly imparts to bitumen bases or bituminous compositions, with improved mechanical and rheological properties, in particular an unexpected lowering of the dynamic viscosity at a temperature above or equal to 80° C., preferably above 80° C., while preserving good consistency at the temperatures of use. In these earlier works (WO2008107551 and WO2009101275), the applicant showed that adding an organogelator made it possible to harden the bituminous composition without increasing the high-temperature viscosity of the bituminous composition.

The applicant has now been able to demonstrate that the combination of a first specific additive and a second specific additive comprising a particular organogelator has a quite unexpected remarkable effect on the susceptibility to temperature of the bituminous composition, in particular on the viscosity at the temperature of application and, advantageously, on the PI index at the temperature of use while maintaining the hardening effect of the organogelator mentioned in the patent applications of the prior art (WO2008107551). The bituminous compositions according to the invention rectify the drawbacks of the prior art and satisfy the objectives of the invention. It will be demonstrated later on in the description that such a combination of additives makes it possible to lower the dynamic viscosity at a temperature above or equal to 80° C., preferably above 80° C., not only relative to the initial bitumen base but also, quite surprisingly, relative to a bituminous composition comprising either the first additive or the second additive of the organogelator type.

The invention further relates to the use of such a bituminous composition according to the invention, to manufacture a bituminous binder and said bituminous binder in particular in the form of a synthetic binder, an anhydrous binder, a bituminous emulsion, a polymeric bitumen or a fluxed bitumen. The invention also relates to a method of preparing such a bituminous composition according to the invention, in which the first and second additives are added, at temperatures in the range from 100 to 180° C., preferably in the range from 120° C. to 140° C., either to the bitumen alone, to the bitumen whether or not modified by polymers, to the bitumen in the form of bituminous binder or to the bitumen when the latter is in the form of anhydrous binder, bituminous mix, or surface dressing, or during manufacture of said bitumen, bituminous mixes, binders or coatings. According to the invention, this object is also achieved by a bituminous mix comprising such a composition according to the invention, aggregates of bituminous mixes and mineral and/or synthetic fillers.

The invention also relates to the use of a combination of a first additive and a second additive in a bituminous composition or a bitumen base, for thermoreversibly cross-linking said bituminous composition or bitumen base. The use makes it possible, in particular, to lower the dynamic viscosity of a bituminous composition or of a bitumen base at a temperature above or equal to 80° C., preferably above 80° C., without impairing the consistency of said composition at the temperatures of use.

In particular, the invention relates to such a use for increasing the softening point determined by the ring and ball test according to standard EN 1427 (RBT) and the penetration index (or Pfeiffer index, PI) while lowering the dynamic viscosity at a temperature above or equal to 80° C., preferably above 80° C., of said composition or bitumen base. According to a preferred variant, the use of such a combination is particularly effective for lowering the needle penetration at 25° C. according to standard EN 1426 ($P_{25}$) of said composition or bitumen base. According to a development of the invention, when the first additive comprises an organogelator of general formula (I), the use of such a combination makes it possible to increase the softening point determined by the ring and ball test according to European standard EN 1427 (RBT) and the penetration index (or Pfeiffer index, PI), and to lower the dynamic viscosity of the bituminous composition or bitumen base, at a temperature above or equal to 80° C., preferably above 80° C.

DETAILED DESCRIPTION

According to a particular embodiment, a bituminous composition comprises a bitumen, a first additive and a second additive comprising at least one organogelator. The bitumen used may originate from various origins: bitumens of natural origin, those contained in deposits of natural bitumen, of natural asphalt or bituminous sands and those originating from refining of crude oil, in particular from atmospheric and/or vacuum distillation of petroleum. The bitumen may optionally be blown, visbroken and/or deasphalted. The bitumen may be a bitumen of hard grade or of soft grade. The various bitumens obtained by the refining processes may be combined with one another to obtain the best technical compromise. The bitumen may also be a bitumen fluxed by adding volatile solvents, fluxing agents of petroleum origin and/or fluxing agents of vegetable origin.

The bitumen may, moreover, be selected from special bitumens such as bitumens modified by addition of polymers. As examples of polymers for bitumen, there may be mentioned elastomers such as the polystyrene, polybutadiene or polyisoprene, SB, SBS, SIS, SBR block copolymers, the EPDM polymers, polychloroprene, polynorbornene and, optionally, the polyolefins such as polyethylenes PE, HDPE, polypropylene PP, plastomers such as EVA, EMA, copolymers of olefins and unsaturated carboxylates EBA, polyolefin-elastomer copolymers, polyolefins of the polybutene type, copolymers of ethylene and esters of acrylic acid, methacrylic acid or maleic anhydride, copolymers and terpolymers of ethylene and glycidyl methacrylate, ethylene-propylene copolymers, rubbers, polyisobutylenes, SEBS and ABS. Preferably, however, bitumens not modified by addition of polymers will be selected. The bituminous composition preferably comprises a bitumen of soft grade, advantageously a bitumen base of grade 50/70, 70/100, 100-150, 160/220, 250-330, preferably 50/70, 70/100.

The first additive comprises at least one fatty acid ester function, saturated or unsaturated, having a linear or branched hydrocarbon chain with 4 to 36 carbon atoms, preferably with 4 to 24 carbon atoms, more preferably with 12 to 24 carbon atoms, even more preferably with 16 to 22 carbon atoms. By unsaturated fatty acid is meant a fatty acid that comprises one or more carbon-carbon double bonds. The hydrocarbon chain may optionally be substituted by at least one hydroxyl group.

According to a particular embodiment, the first additive has a general formula (III) as follows:

(III)

in which $G_1$ represents a saturated or unsaturated, linear or branched aliphatic hydrocarbon chain with 4 to 36 carbon atoms, preferably with 4 to 24 carbon atoms, more preferably with 12 to 24 carbon atoms, even more preferably with 16 to 22 carbon atoms.

$G_2$ represents a saturated or unsaturated, linear or branched aliphatic hydrocarbon chain with 1 to 188 carbon atoms, optionally comprising at least one ester function and/or at least one hydroxyl group.

$G_2$ may contain at least one fatty acid ester function, saturated or unsaturated, preferably at least two, more preferably at least three, even more preferably at least four. The corresponding fatty acids advantageously have a linear or branched hydrocarbon chain with 4 to 36 carbon atoms, preferably with 4 to 24 carbon atoms, more preferably with 12 to 24 carbon atoms, even more preferably with 16 to 22 carbon atoms. Preferably, 12-hydroxy-octadecanoic acid will be selected as the fatty acid. In $G_1$ and $G_2$, each hydrocarbon chain may optionally be substituted by at least one hydroxyl group.

The first additive may advantageously be selected from the group consisting in the saturated or unsaturated mono-, di-, tri-, tetra-, penta- and hexa-esters of fatty acid, comprising at least one linear or branched hydrocarbon chain with 4 to 36 carbon atoms, preferably with 4 to 24 carbon atoms, more preferably with 12 to 24 carbon atoms, even more preferably with 16 to 22 carbon atoms. As examples of non-hydroxylated mono-esters of fatty acid, there may be mentioned the alkyl, in particular methyl, ethyl, propyl and butyl, palmitates (C16, saturated), stearates (C18, saturated), oleates (C18, unsaturated), linoleates (C18, unsaturated). As examples of hydroxylated mono-esters of fatty acid, there may be mentioned ethylene glycol monostearate, methyl 12-hydroxystearate, ethyl 12-hydroxystearate, ethylene glycol hydroxystearate and glycerol monohydroxystearate.

The first additive will preferably be selected from the group consisting in the saturated or unsaturated di-, tri-, tetra-, penta- and hexa-esters of fatty acid, comprising at least one linear or branched hydrocarbon chain with 4 to 36 carbon atoms, preferably with 4 to 24 carbon atoms, more preferably with 12 to 24 carbon atoms, even more preferably with 16 to 22 carbon atoms. As examples of di-esters of fatty acid, non-hydroxylated and hydroxylated respectively, there may be mentioned ethylene glycol distearate (non-hydroxylated) and the glycerol diester of bis(12-hydroxyoctadecanoic acid). As examples of tri-esters of fatty acid, non-hydroxylated and hydroxylated respectively, there may be mentioned glycerol tristearate and the glyceryl ester of 12-hydroxyoctadecanoic acid. As examples of tetra- and hexa-esters of fatty acid, there may be mentioned pentaerythritol (PET) tetrastearate and pentaerythritol (PET) tetraisononanoate.

The hydrocarbon chain may advantageously be substituted by at least one hydroxyl group. The derivatives of the glycerides of fatty acids, of hydroxy fatty acids, of pentaerythritol (PET) or dipentaerythritol (diPET) comprising at least one linear or branched hydrocarbon chain with 4 to 36 carbon atoms, preferably with 4 to 24 carbon atoms, more preferably with 12 to 24 carbon atoms, even more preferably with 16 to 22 carbon atoms, will preferably be selected. The first additive is advantageously selected from the group consisting in the mono-, di- and tri-glycerides of fatty acids, the mono-, di- and tri-glycerides of hydroxy fatty acids, the fatty acid mono-, di-, tri- and tetra-esters of pentaerythritol (PET) and the fatty acid mono-, di-, tri-, tetra-, penta- and hexa-esters of dipentaerythritol (diPET), the fatty acids being as described above.

The first additive may preferably be selected from the triglycerides of fatty acids comprising three hydrocarbon chains, identical or different, each independently saturated or unsaturated, linear or branched, with 4 to 36 carbon atoms, preferably with 4 to 24 carbon atoms, more preferably with 12 to 24 carbon atoms, even more preferably with 16 to 22 carbon atoms. The hydrocarbon chain may advantageously be substituted by at least one hydroxyl group. The saturated or unsaturated triglycerides of fatty acid are of vegetable origin or may be obtained by synthesis or modifications of compounds of vegetable origin. Thus, an unsaturated C18 fatty acid triglyceride such as castor oil (triglyceride of ricinoleic acid) may be hydrogenated by any known process, to obtain the triglyceride of 12-hydroxystearic acid corresponding to said saturated fatty acid triglyceride.

The preferred first additive is selected from the mono-, di- or triglyceride of 12-hydroxystearic acid, in particular the triglyceride of 12-hydroxystearic acid of the following formula:

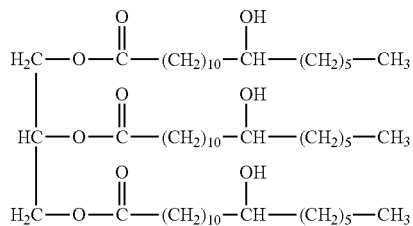

According to a preferred embodiment, a first additive comprising at least one saturated fatty acid ester function will be selected.

The second additive comprises at least one organogelator advantageously having a molecular weight less than or equal to 2000 g·mol$^{-1}$, preferably less than or equal to 1000 g·mol$^{-1}$. As detailed in the applicant's patent application WO2008107551, by organogelator is meant compounds capable of establishing physical interactions between them leading to an auto-aggregation with formation of a 3D supramolecular network, which is responsible for the gelling of bitumen. Close packing of the organogelators results in the formation of a network of fibrils, immobilising the bitumen molecules.

At the temperatures of use, in the range from 10 to 60° C., the organogelators bind to one another non-covalently, in particular by hydrogen bonds. These hydrogen bonds disappear when the bitumen is heated to high temperature. Thus, at the temperatures of use, the organogelator constituted of a large number of organogelators may be assimilated to a "supramolecular" polymer and imparts to the bitumen thus modified, the properties of a conventional bitumen/polymer composition, in particular in respect of hardness. At the temperatures of use, gelling due to aggregation of the organogelling molecules causes thickening of the bituminous medium, leading to an increase in hardness. The bitumen no longer flows under its own weight, and its hardness at the temperatures of use is increased relative to the starting bitumen alone without organogelling additive. When the bituminous composition is heated, the interactions stabilizing the organogelator disappear and the bitumen regains the properties of a bitumen without additive, and the viscosity of the bituminous composition at high-temperature is once again the same as that of the starting bitumen.

In the context of the invention, the organogelator comprises at least one hydrogen bond acceptor A and at least one hydrogen bond donor D. For gelling and setting of the bitumen, the organogelator must be soluble at high temperature in the bitumen. The main chemical constituents of bitumen are asphaltenes and maltenes. The asphaltenes are compounds, in particular heterocyclic, constituted of numerous aromatic nuclei and polycondensed naphthenic rings. The maltenes in their turn mainly are constituted of long paraffinic chains. Consequently, the organogelator according to the invention also comprises at least one chemical group C compatibilizing the organogelator with the chemical compounds of the bitumen. This compatibilizer C may comprise, alone or in a mixture, a group selected from: at least one long hydrocarbon chain compatible with the maltene fraction of bitumen, or at least one aliphatic ring with 3 to 8 atoms, or at least one condensed polycyclic system, aliphatic, partially aromatic or entirely aromatic, compatible with the asphaltene fraction of bitumen, each ring preferably comprising from 5 to 8 atoms.

In the context of the invention, preferably a second additive will be selected having a melting point below 180° C., preferably below 140° C., allowing it to be used at the temperatures of use and of application of the bituminous compositions. The second additive comprises at least one organogelator. The organogelators will be selected from the diamides of fatty acid and the carboxylic polyacids having at least one hydrogen acceptor function A, at least one hydrogen bond donor D and at least one compatibilizing chemical group C. Examples of organogelators usable in the invention are in particular those described in patent application WO2008107551 and in the article by P. Terech and R. G. Weiss "Low molecular mass gelators of organic liquids and the properties of their gels" (Chem. Rev. 1997, 97, 3133-3159); these two documents being mentioned as examples and incorporated by reference in the present application.

According to a particular embodiment, the second additive comprises at least one organogelator of the following general formula (I):

in which the groups $R_1$, $R_2$ and X are identical or different and represent independently a hydrocarbon chain, saturated or unsaturated, linear or branched, cyclic or acyclic, with 4 to 36 carbon atoms, preferably with 4 to 24 carbon atoms, more preferably with 12 to 24 carbon atoms, even more preferably with 16 to 22 carbon atoms. The hydrocarbon chain may optionally contain at least one heteroatom, for example selected from O, N and S, preferably O.

Advantageously, the groups $R_1$ and $R_2$ are identical or different and represent, independently, saturated linear hydrocarbon chains with 4 to 36 carbon atoms, preferably with 4 to 24 carbon atoms, more preferably with 12 to 24 carbon atoms, even more preferably with 16 to 22 carbon atoms. Among the preferred saturated linear hydrocarbon chains, there may be mentioned the groups $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$. Alternatively, the hydrocarbon chain may comprise an aliphatic $C_3$-$C_8$ monocyclic ring or $C_6$-$C_{14}$ condensed polycyclic, preferably $C_6$-$C_{10}$ condensed polycyclic ring and/or a $C_5$-$C_8$ monocyclic aromatic ring, preferably $C_5$-$C_6$ monocyclic aromatic ring or $C_6$-$C_{14}$ condensed polycyclic, preferably $C_8$-$C_{12}$ condensed polycyclic ring. The aliphatic or aromatic rings may optionally contain heteroatoms selected from O, N and S, preferably O. The aliphatic or aromatic, monocyclic or condensed polycyclic rings may optionally be substituted by at least one group selected from halogens, hydroxyl group, primary amine group, sulphydryl group and $C_1$-$C_8$ hydrocarbon chains, saturated or unsaturated, linear or branched, optionally comprising at least one heteroatom selected from O, N and S, preferably O.

The organogelator is preferably a fatty acid diamide represented by formula (I) in which X represents the group —$(CH_2)_p$— with p being comprised between 1 and 8, preferably between 1 and 4. Advantageously, the organogelator is represented by formula (I) in which $R_1$ and $R_2$ are identical or different and represent independently a saturated, acyclic, linear or branched hydrocarbon chain with 4 to 36 carbon atoms, preferably with 4 to 24 carbon atoms, more preferably with 12 to 24 carbon atoms, even more preferably with 16 to 22 carbon atoms, and optionally at least one heteroatom.

In particular, N,N'-ethylene-bis(stearamide) of the following formula: $C_{17}H_{35}$—CONH—$CH_2$—$CH_2$—NHCO—$C_{17}H_{35}$, will be selected as organogelator.

According to another particular embodiment, the second additive comprises at least one organogelator of the following general formula (II):

$$R_3—(COOH)_z \qquad (II)$$

in which $R_3$ is a linear or branched, saturated or unsaturated hydrocarbon chain comprising from 4 to 68 carbon atoms, preferably from 4 to 54 carbon atoms, more preferably from 4 to 36 carbon atoms, even more preferably from 4 to 22 carbon atoms and z is an integer in the range from 2 to 4.

The organogelator represented by formula (II) is preferably a diacid of general formula HOOC—$(CH_2)_w$—COOH with w an integer in the range from 4 to 22, preferably from 4 to 18. The preferred organogelators are the diacids selected from the group consisting in adipic acid, pimelic acid, suberic acid, azelaic acid, sebacic acid, undecanedioic acid, 1,2-dodecanedioic acid and tetradecanedioic acid.

The bituminous compositions according to the invention are constituted of a major part of bitumen and a minor part of the first and second additives. In particular, the bituminous composition advantageously comprises from 0.1 to 10% by weight of the first and second additives relative to the weight of bitumen.

The bituminous composition typically comprises from 0.1 to 5.0% by weight of each of the first or second additives, relative to the weight of bitumen. A quantity less than 0.1% by weight of the first or second additive might be insufficient to obtain an effect on the rheological properties of the bituminous composition according to the invention, because the molecules constituent the first and second additives would be too distant from one another to interact. Conversely, a quantity above 5.0% by weight could impair the properties of the bitumen base.

The bituminous composition advantageously comprises from 0.5 to 3% by weight, preferably from 1 to 2% by weight of the first additive relative to the weight of bitumen. The bituminous composition advantageously comprises from 0.5 to 3% by weight, preferably from 1 to 2% by weight of the second additive relative to the weight of bitumen. According to a preferred embodiment, the second additive contains at least 50% by weight of the organogelator, preferably at least 80%. The second additive is advantageously constituted of the organogelator, apart from some impurities conventionally present in such compounds, but not exceeding 2 to 3%. The weight ratio between the first additive and the second additive is preferably comprised between 5:0.1 and 0.1:5, preferably between 2:0.2 and 0.2:2.

Other conventional additives may also be added to a bituminous composition according to the invention. These are, for example, vulcanizing agents and/or cross-linking agents that are able to react with a polymer, when it is an elastomer and/or a plastomer, which may be functionalized and/or may comprise reactive sites. Among the vulcanizing agents, there may be mentioned those based on sulphur and derivatives thereof, used for cross-linking an elastomer at contents from 0.01% to 30% relative to the weight of elastomer.

Among the cross-linking agents, there may be mentioned the cationic cross-linking agents such as the mono- or poly-acids, or carboxylic anhydrides, carboxylic acid ester, sulphonic, sulphuric, phosphoric acids, or even the acid chlorides, the phenols, at contents from 0.01% to 30% relative to the polymer. These agents are able to react with the functionalized elastomer and/or plastomer. They may be used to supplement or to replace the vulcanizing agents.

The invention also relates to a method of preparing a bituminous composition as described above, hard at the temperatures of use and of low viscosity when hot. The first and second additives described above may equally well be added to the bitumen alone, or during manufacture of bitumens, bitumen mixes, binders or dressings. The first and second additives are added to the bitumen, whether or not modified by polymers, to the bitumen in the form of bituminous binder or to the bitumen when the latter is in the form of synthetic binder, of anhydrous binder, of bituminous mix, or of surface dressing, but always hot, at temperatures in the range from 100 to 180° C., preferably 120° C. to 140° C. The first and second additives may be introduced separately or as a mixture; the order of introduction does not have any particular influence on the properties of the bituminous composition thus obtained. The mixtures may then be stirred at these temperatures until the first and second additives have dissolved in the bitumen, polymeric bitumen, bituminous binder, synthetic binder, binder in anhydrous form or in the form of bituminous mix.

EXAMPLES

The invention is illustrated by the following non-limitative examples. The rheological and mechanical characteristics of the bitumen bases or bituminous compositions referred to in these examples are measured in the manner indicated in Table 1. Moreover, the Brookfield viscosity is expressed in mPa·s. The viscosity is measured by means of a Brookfield CAP 2000+ viscosimeter. It is measured at 80° C. and 120° C. and at a rotary speed of 15 rev/min and 400 rev/min, respectively. The measurement is read after 30 seconds for each temperature.

TABLE 1

| Property | Abbreviation | Unit [[Unit]] | Measurement standard |
|---|---|---|---|
| Needle penetration at 25° C. | $P_{25}$ | 1/10 mm | EN 1426 |
| Ring and ball softening point | RBT | ° C. | EN 1427 |
| Brookfield viscosity | — | MPa · s | Cf. examples |

Starting Products:
Bitumen Bases:
Direct distillation bitumen, designated $B_0$, of class 70/100 and with penetration at 25° C. of 74 1/10 mm the characteristics of which comply with standard EN 12591.
First Additive:
triglyceride of 12-hydroxystearic acid, designated $A_1$,
castor oil, designated $A_2$,
methyl stearate, designated $A_3$.
Second Additive:
sebacic acid, designated $O_1$,
N,N'-ethylene-bis(stearamide), designated $O_2$.
Preparation of the Bituminous Compositions:
First the bitumen is put in the reactor at 170° C. Then, the first and second additives are added. The reaction mixture is then stirred until a homogeneous final appearance is obtained (about 60 minutes). The mixture is then cooled to ambient temperature.
The results are presented in Table 2 below:

The needle penetration, measured at 25° C., is expressed in 1/10 mm. The ring and ball softening point is expressed in ° C. The Brookfield viscosity, measured at 120° C., is expressed in mPa·s.

The Pfeiffer penetration index is defined by the following calculation formula:

$$PI = \frac{1952 - 500 \times \log(P_{25}) - 20 \times RBT}{50 \times \log(P_{25}) - RBT - 120}$$

The results presented in Table 2 show a remarkable effect resulting from the combination of the first additive and second additive.

In fact, in the case of a fluxed bitumen or a fluxed bituminous composition, it is known that the addition of a flux lowers the viscosity and simultaneously disturbs the consistency of the bitumen, in particular lowering the RBT (EN NF 1427) and/or increasing the needle penetration at 25° C. (NF EN 1426). Starting from a bitumen or a bituminous composition containing an organogelator, a person skilled in the art would naturally expect to observe a degradation of the PI simultaneously with the decrease in viscosity. Now, at a temperature above or equal to 80° C., low dynamic viscosity is obtained without impairing, or even with improvement of, the consistency of the bituminous composition containing the first organogelling additive at the temperature of use.

In particular, regardless of the nature of the first additives $A_1$, $A_2$ or $A_3$ or second additives $O_1$ or $O_2$, it can be seen that the value of the dynamic viscosity measured at 120° C. of the bituminous composition comprising such a combination is below at the value of the dynamic viscosity measured at 120° C. of the bitumen base alone $B_0$, the bitumen base with the first additive, $T^0_{A1}$, $T^0_{A1}$'$T^0_{A2}$ or $T^0_{A3}$ or the bitumen base with the second additive $T^0_{O1}$ or $T^0_{O2}$. For example, a remarkable effect is observed on the dynamic viscosity of the composition $C^0_{A1/O2}$ with a dynamic viscosity of 439 at 120° C. and a PI of 5.92 against 685 and −1.05 for the bitumen base ($B^0$), 528 and −1.24 for the control composition for $T^0_{A1}$ and 582 and 5.85 for the control composition $T^0_{O2}$.

This effect is less pronounced at a temperature equal to 80° C. since the dynamic viscosity value of the composition $C^0_{A1/O2}$ of 10300 mPa·s, although lower than that of the bitumen base of 12725 mPa·s and of the composition $T^0_{O2}$ of 17200 mPa·s, nevertheless remains above that of the

TABLE 2

| Ref. | Bituminous composition first additive ($A_x$) | second additive ($O_x$) | Bitumen base | % by weight $A_x/O_x$ | $P_{25}$ | PI Index | RBT | Viscosity 80° C. | Viscosity 120° C. |
|---|---|---|---|---|---|---|---|---|---|
| $B^0$ | — | — | $B_0$ | | 74 | −1.05 | 47 | 12725 | 685 |
| $T^0_{A1}$ | $A_1$ | — | $B_0$ | 3 | 77 | −1.24 | 46 | 8360 | 528 |
| $T^0_{A1'}$ | $A_1$ | — | $B_0$ | 2 | 76 | −0.98 | 47 | 9200 | 568 |
| $T^0_{A1"}$ | $A_1$ | — | $B_0$ | 1 | 72 | −1.30 | 46.5 | 10350 | 600 |
| $T^0_{O1}$ | — | $O_1$ | $B_0$ | 1 | 37 | 4.14 | 84.5 | 13950 | 645 |
| $C^0_{A1/O1}$ | $A_1$ | $O_1$ | $B_0$ | 3/1 | 41 | 3.25 | 76 | 8500 | 500 |
| $C^0_{A1"/O1}$ | $A_1$ | $O_1$ | $B_0$ | 1/1 | 38 | 4.14 | 84 | 11850 | 568 |
| $T^0_{A3}$ | $A_3$ | — | $B_0$ | 3 | >185 | −1.55* | 37.5 | 5625 | 409 |
| $C^0_{A3/O1}$ | $A_3$ | $O_1$ | $B_0$ | 3/1 | 77 | 6.18 | 84.5 | 6090 | 392 |
| $T^0_{O2}$ | — | $O_2$ | $B_0$ | 2 | 50 | 5.85 | 92.4 | 17200 | 585 |
| $C^0_{A1/O2}$ | $A_1$ | $O_2$ | $B_0$ | 3/2 | 49 | 5.92 | 93.5 | 10300 | 439 |
| $C^0_{A1/O2'}$ | $A_1$ | $O_2$ | $B_0$ | 2/2 | 52 | 6.34 | 96 | 11800 | 480 |
| $T^0_{A2}$ | $A_2$ | — | $B_0$ | 3 | 125 | −0.97 | 42.4 | 7450 | 448 |
| $T^0_{O2}$ | — | $O_2$ | $B_0$ | 2 | 50 | 5.85 | 92.4 | 17200 | 585 |
| $C^0_{A2/O2}$ | $A_2$ | $O_2$ | $B_0$ | 3/2 | 80 | 7.29 | 93 | 10250 | 443 |
| $T^0_{A3}$ | $A_3$ | — | $B_0$ | 3 | >185 | −1.55* | 37.5 | 5625 | 409 |
| $T^0_{O2}$ | — | $O_2$ | $B_0$ | 2 | 50 | 5.85 | 92.4 | 17200 | 585 |
| $C^0_{A3/O2}$ | $A_3$ | $O_2$ | $B_0$ | 3/2 | 120 | 5.99 | 72 | 6780 | 348 |

*minimum value given as a guide as the value of the penetration $P_{25}$ could not be determined accurately (limit of measurement at 185)

composition $T^0_{A1}$ (8360 mPa·s). The effect of the specific combination of the first and second additives is in this sense completely surprising.

Moreover, a synergistic effect is observed on the PI and on the hardness of the compositions. The PI of the composition $C^0_{A1/O2}$ increases, for example, to 5.92 whereas the PI of the bitumen base $B_0$ is −1.05 and the PI values of the control compositions $T^0_{A1}$ and $T^0_{O2}$ are −1.24 and 5.85 respectively. The needle penetration at 25° C. of the composition $C^0_{A1/O2}$ of 49° C. is below the needle penetration value of the bitumen base $B^0$ (74° C.) or of the control composition $T^0_{O2}$ (50° C.).

It should also be noted that the effect is more pronounced for the combinations comprising a first additive $A_1$ (triglyceride with saturated hydrocarbon chain) compared to $A_2$ (triglyceride with hydrocarbon chain with an unsaturation). Moreover, the combinations comprising a first additive $A_2$ (monoester) have better performance in terms of penetration $P_{25}$ than those comprising a first additive $A_3$ (polyester). Thus, appropriate selection of the first additive and of the second additive makes it possible to adjust the mechanical and rheological properties of the bituminous composition or bitumen base according to the application for which it is intended.

These results provide evidence of a significant thermoreversible effect due to the simultaneous presence of the first and second additives in the bitumen base or bituminous composition. Interaction of the first and second additives is reflected in an appreciable decrease in high-temperature viscosity without impairing the consistency of the bitumen base or bituminous composition, in particular without impairing the PI, RBT and/or needle penetration at 25° C. Within the bituminous combination, the combination of the first and second additives induces specific rheological properties that go beyond the intrinsic properties of each of the first and second additives taken separately. Thus, the object is an appreciable decrease in viscosity or a low viscosity, i.e. obtaining a dynamic viscosity lower than the dynamic viscosity of each of the first and second additives taken independently.

Another aspect of the invention consequently relates to the use of a combination of a first additive and a second additive as described above for improving the mechanical and rheological properties, in particular for lowering the dynamic viscosity of a bituminous composition or of a bitumen base at a temperature above or equal to 80° C., preferably above 80° C., without impairing the consistency of said composition at the temperatures of use, said first and second additives being as described above. The decrease in viscosity is all the more surprising in that the dynamic viscosity value at 120° C. obtained for a bituminous composition or a bitumen base with these additives is above not only to the composition or the bitumen base alone but also the value of the dynamic viscosity at 120° C. obtained on compositions or bitumen bases containing independently the first additive alone or the second additive alone while preserving the hardness and elasticity at the temperature of use.

As is evidenced by the examples described above, the applicant has also discovered that when the first additive comprises an organogelator of general formula (I), the use of the specific combination of the first and second additives according to the invention in a bituminous composition or a bitumen base makes it possible to increase the RBT and the PI while lowering the dynamic viscosity of said composition or bitumen base, at a temperature above or equal to 80° C., preferably above 80° C. Moreover, the use of such a combination in a bitumen base or a bituminous composition allows a significant decrease the penetration at 25° C. (1/10 mm) according to standard EN 1426 when the organogelator of the second additive is represented by formula (I).

The bituminous compositions comprising such a combination according to the invention combine high-performance mechanical properties at the temperature of use and low susceptibility to temperature at the temperature of application. Various uses of the bituminous compositions obtained according to the invention are envisaged, in particular for preparing a bituminous binder, in particular a synthetic binder, an anhydrous binder, a bituminous emulsion, a polymeric bitumen or a fluxed bitumen, which may in its turn be used for preparing a combination with aggregates, in particular highway aggregates. Another aspect of the invention is the use of a bituminous composition in various industrial applications, in particular for preparing a sealing coating, a membrane or a prime coat.

With regard to highway applications, the invention relates in particular to bituminous mixes as materials for the construction and maintenance of pavement systems and for covering them as well as for carrying out all road works. The bituminous mix comprises a bituminous composition as described above, aggregates of bituminous mixes and mineral and/or synthetic fillers. Thus, the invention relates for example to surface dressings, hot bituminous mixes, cold bituminous mixes, cold poured bituminous mixes, emulsion-gravel mixtures, base courses, binder courses, bonding courses and surfacing, and other combinations of a bituminous binder and highway aggregate having particular properties, such as anti-rut courses, bituminous mixes for drainage or asphalts (mixture of a bituminous binder with aggregates of the sand type). Regarding the industrial applications of the bituminous compositions, there may be mentioned the manufacture of sealing membranes, anti-noise membranes, isolating membranes, surface coverings, carpet slabs, prime coats. The present invention is remarkable in that it proposes a bituminous binder that can be used for manufacturing asphaltic or bituminous products at temperatures of manufacture and implementation low enough to eliminate or, at the very least, greatly reduce the emissions of fumes while preserving the mechanical properties of the asphaltic or bituminous products obtained.

The invention claimed is:

1. A thermoreversibly cross-linked bituminous composition comprising:
   a bitumen;
   a first additive being selected from triglycerides of fatty acids comprising three hydrocarbon chains, identical or different, each independently having from 4 to 36 carbon atoms, saturated or unsaturated, linear or branched; and
   a second additive comprising at least one organogelator of the following general formula (I) or (II):

$$R_1\text{—CONH—X—NHCO—}R_2 \quad (I)$$

in which the groups $R_1$, $R_2$ and X are identical or different and represent independently a hydrocarbon chain with 4 to 36 carbon atoms, saturated or unsaturated, linear or branched, cyclic or acyclic;

$$R_3\text{—(COOH)}_z \quad (II)$$

in which $R_3$ is a linear or branched, saturated or unsaturated hydrocarbon chain comprising from 4 to 68 carbon atoms and z is an integer in the range from 2 to 4; and wherein the weight ratio between the first additive and the second additive in said bituminous composition is comprised between 10:1 and 3:1.

2. The composition according to claim 1, wherein the fatty acids are saturated.

3. The composition according to claim 1, wherein the organogelator is a diacid of general formula HOOC—(CH$_2$)$_w$—COOH with w an integer in the range from 4 to 22.

4. The composition according to claim 3, wherein w is an integer in the range from 4 to 18.

5. The composition according to claim 1, wherein the organogelator is a diacid selected from the group consisting of adipic acid, pimelic acid, suberic acid, azelaic acid, sebacic acid, undecanedioic acid, 1,2-dodecanedioic acid and tetradecanedioic acid.

6. The composition according to claim 1, wherein the organogelator is represented by formula (I) in which X represents the group —(CH$_2$)$_p$— with p being comprised between 1 and 8.

7. The composition according to claim 6, wherein p is comprised between 1 and 4.

8. The composition according to claim 1, wherein the organogelator is represented by formula (I) in which R$_1$ and R$_2$ are identical or different and represent, independently, a saturated, acyclic, linear or branched hydrocarbon chain with 4 to 36 carbon atoms.

9. The composition according to claim 1, wherein said composition comprises from 0.1 to 10% by weight of the first and second additives relative to the weight of bitumen.

10. The composition according to claim 1, further comprising aggregates of bituminous mixes and at least one of mineral fillers and synthetic fillers.

11. A bituminous binder in the form of a synthetic binder, an anhydrous binder, a bituminous emulsion, a polymeric bitumen or a fluxed bitumen comprising a bituminous composition comprising:
   a bitumen;
   a first additive being selected from triglycerides of fatty acids comprising three hydrocarbon chains, identical or different, each independently having from 4 to 36 carbon atoms, saturated or unsaturated, linear or branched; and
   a second additive comprising at least one organogelator of the following general formula (I) or (II):

   $$R_1—CONH—X—NHCO—R_2 \quad (I)$$

in which the groups R$_1$, R$_2$ and X are identical or different and represent independently a hydrocarbon chain with 4 to 36 carbon atoms, saturated or unsaturated, linear or branched, cyclic or acyclic;

   $$R_3—(COOH)_z \quad (II)$$

in which R$_3$ is a linear or branched, saturated or unsaturated hydrocarbon chain comprising from 4 to 68 carbon atoms and z is an integer in the range from 2 to 4; and
   wherein the weight ratio between the first additive and the second additive in said bituminous composition is comprised between 10:1 and 3:1.

12. A method of preparing the bituminous composition of claim 1, the method comprising:
   adding the first and second additives at temperatures in the range from 100 to 180° C., either to the bitumen alone, the bitumen whether or not modified by polymers, the bitumen in the form of bituminous binder or the bitumen in the form of anhydrous binder, bituminous mix, or surface dressing, or during manufacture of the bitumen, bituminous mixes, binders or coatings.

13. A method for thermoreversibly cross-linking a bituminous composition or a bitumen base, comprising introducing the combination of a first additive and a second additive as described in claim 1 in the bituminous composition or the bitumen base.

14. The method for lowering the dynamic viscosity of a bituminous composition or a bitumen base at a temperature above or equal to 80° C., without impairing a consistency of the composition or base at the temperatures of use, comprising introducing the combination of the first additive and the second additive as described in claim 1 in the bituminous composition or the bitumen base.

15. The method according to claim 14, for increasing a softening point determined by a ring and ball test according to standard EN 1427 (RBT) and a penetration index (or Pfeiffer index, PI) while lowering a dynamic viscosity at a temperature above or equal to 80° C., of the bituminous composition or a bitumen base, comprising introducing the combination of a first additive and a second additive in the bituminous composition or the bitumen base.

16. The method according to claim 15, in which the first additive introduced comprises an organogelator of general formula (I).

17. The method according to claim 14, for lowering a needle penetration at 25° C. calculated according to standard EN 1426 (P$_{25}$) of the bituminous composition or the bitumen base, comprising introducing the combination of the first additive and the second additive in the bituminous composition or the bitumen base.

* * * * *